United States Patent Office 2,980,455
Patented Apr. 18, 1961

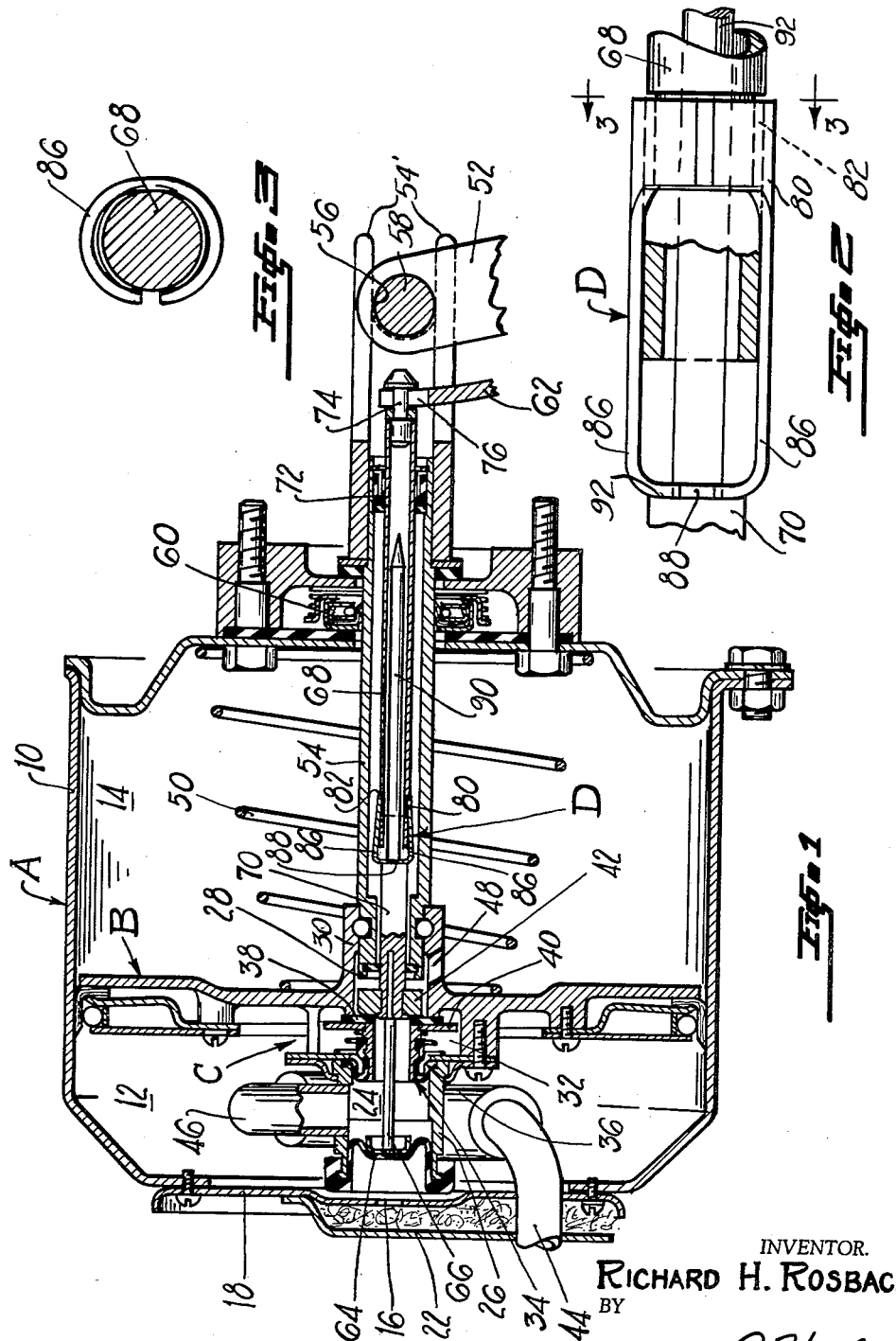

2,980,455
DETENT MECHANISM

Richard H. Rosback, South Bend, Ind., assignor to The Bendix Corporation, a corporation of Delaware Original application June 7, 1957, Ser. No. 664,325. Divided and this application Oct. 10, 1958, Ser. No. 768,821

2 Claims. (Cl. 287—58)

The present invention relates to detent mechanisms, and is a division of application Serial Member 664,325, filed June 7, 1957, now Patent No. 2,897,789.

An object of the present invention is the provision of a new and improved detent mechanism which will permit telescopic movement between two relatively movable parts, and which will have a radial extent only slightly greater than the telescopic member itself.

Another object of the present invention is the provision of a new and improved detent mechanism of the above described type which is formed from a single stamped clip that is retained immovable upon one of the parts by means of a first spring action of the clip, and which provides a detent action for transmitting limited forces by means of a second spring action of the clip.

A further object of the invention is the provision of a new and improved detent mechanism of the above described type for connecting two telescopic members utilizing a stamped clip having an annular body portion which snaps into a receiving groove in one of the members, and a plurality of fingers extending axially therefrom the ends of which are spring biased radially into a recess in the other of the members—which other member has a shoulder adjacent the recess whereby large forces can be transmitted in one direction across the detent mechanism by means of abutment of the fingers with the shoulder; and whereby limited forces will be transmitted in the other direction by means of the biasing action of the fingers into their receiving recess.

The invention resides in certain constructions and combinations and arrangements of parts, and further objects and advantages will become apparent to those skilled in the art to which the invention relates from the following description of the preferred embodiment described with reference to the accompanying drawing forming a part of this specification, and in which:

Figure 1 is a cross-sectional view of a fluid pressure servomotor embodying principles of the present invention;

Figure 2 is an enlarged view of a part shown in Figure 1; and

Figure 3 is a section taken on the line 3—3 of Figure 2.

There is shown in the drawing a servomotor driven leverage system of the type shown in the Hupp et al. Patent No. 2,829,625. In systems of this type the control and force transmitting levers can be moved or operated manually without moving any of the power actuated element of the servomotor; such that during power failure of the servomotor, none of the manual effort applied to the leverage system will be absorbed in moving the power actuated elements within the servomotor. When power is available, however, to operate the servomotor, movement of the control lever operates the servomotor control valve to actuate the servomotor and thereby assist the forces being supplied to the leverage system manually.

The fluid pressure servomotor A shown in the drawing generally comprises a power chamber 10 divided into opposing fluid pressure chambers 12 and 14 by a movable wall or piston B. Atmospheric pressure is continually admitted to the opposing chamber 12 through an opening 16 in the cover plate 18 on one end of the power chamber 10; which opening is covered with filter material held in place by a sheet metal bracket 22 that is spot welded to the cover plate 18. The servomotor A is a so-called atmospheric suspended unit in which atmospheric pressure is supplied to the opposing fluid pressure chambers 12 and 14 in the normal or non-actuated condition of the motor. Movement of the power piston B is controlled by means of a control valve structure C carried by the piston B, and adapted to admit vacuum into the opposing chamber 14 when it is called upon to actuate the servomotor.

The control valve C generally comprises a vacuum chamber 24 formed by means of an annular tube 26 bolted to the front side of the piston B, a control chamber 28 formed by an annular boss 30 extending forwardly (to the right as seen in the drawing) from the piston B, and an annular atmospheric area 32 positioned generally between the vacuum and control chambers and forming a part of the opposing fluid pressure chamber 12. The atmospheric chamber 32 is isolated from the vacuum chamber 24 by means of a tubular poppet member 34 having a diaphragm 36 positioned between the tubular poppet member 34 and the tubular member 26. The forward end of the tubular poppet member 34 is flanged to provide a suitable sealing surface adapted to engage an annular atmospheric valve seat 38 on the rear surface of the power piston B surrounding the control chamber 28 to thereby close off communication between the atmospheric chamber 32 and the control chamber 28. Communication between the vacuum chamber 24 and the control chamber 28 is controlled by means of a poppet member 42 positioned generally within the control chamber 28 in a manner adapted to abut the portion of the front side of the flange 40 surrounding the inner opening through the tubular poppet member 34. Vacuum is continually communicated to the vacuum chamber 24 through the vacuum connection 44 and flexible tubing 46; and its flow to the opposing fluid pressure chamber 14 is regulated by the abutment of the poppet member 42 with the flange 40 of the tubular poppet member 34. In the normal or non-actuated condition of the servomotor, the poppet member 42 will be forced rearwardly to lift the flange 40 from the atmospheric valve seat 38 and thereby permit atmospheric pressure from the opposing fluid pressure chamber 12 to flow through the control chamber 28 and the control passageway 48 in the annular boss 30 to the front opposing chamber 14 of the servomotor. Atmospheric pressure will therefore exist on opposite sides of the power piston B; and the piston will be biased to its retracted position adjacent the rear end of the servomotor by means of the coil spring 50.

The power piston B actuates the force transmitting lever 52 of the leverage system by means of a tubular push rod 54 having an abutment surface 56 thereon adapted to engage a pin 58 carried by the force transmitting lever 52. The tubular push rod 54 is suitably affixed to the power piston B, and passes through suitable sealing structure 60 which will accommodate angular movement of the push rod 54; such that actuation of the power piston B pushes the top end of the force transmitting lever 52 forwardly, or to the right as seen in the drawing.

The control valve structure C is so constructed and arranged that movement of the control lever 62 (only a portion of which is shown in the drawing) in the same direction as the lever 52 is forced during actuation of the servomotor, actuates the servomotor A to power operate or drive the leverage system. The control lever 62 is connected to the poppet 42 in a manner later to be described; such that movement of the poppet 42 to the right communicates vacuum to the forward opposing chamber 14 to create a differential pressure across the power piston B, thereby forcing the power piston B to the right. In the preferred construction of the control valve C, a diaphragm 64 will be used to close off the end of the tubular member 26 to provide a movable wall, or balancing diaphragm 64 between the vacuum chamber 24 and the atmospheric chamber 12 in such manner that the differential pressure across the diaphragm 64 can be used to partially balance the forces across the poppet 42, when the power piston B is in its normal, retracted, or de-energized position. The forces developed across the diaphragm 64 are delivered to the poppet 42 by means of a rod 66 extending through the vacuum chamber 24. The diaphragm 64 is sized slightly larger than required to overcome the unbalanced forces across the poppet 42 when full atmospheric pressure is admitted to the control chamber 28, as occurs during the released or de-energized condition of the control valve. With such an arrangement, the poppet member 42 of the control valve would be biased into a condition which will energize the servomotor were it not for an opposing force delivered by the control lever 62 through its connection with the poppet member 42. In a normal, de-energized, or retracted condition of the servomotor, rearward force of the control lever 62, as developed by suitable spring means, forces the poppet 42 rearwardly against the flange 40 of the tubular poppet member 34 to bias the poppet member 34 out of engagement with the atmospheric valve seat 38. Atmospheric pressure from the rear opposing chamber 12 will therefore pass through the control chamber 28 to the forward opposing piston cylinder chamber 14 to establish atmospheric pressure on both sides of the power piston B, and thereby permit the coil spring 50 to hold the power piston B in its retracted or rearwardly positioned location shown in the drawing. As previously mentioned, the air pressure upon the diaphragm 64 will create a force upon the poppet member 42 tending to open the poppet 42 were it not for the opposing force delivered by the control lever 62.

When it is desired to actuate the servomotor, movement of the control lever 62 to the right permits the diaphragm 64 to urge the poppet member 42 to the right, thereby permitting the tubular poppet member 34 to seat upon the atmospheric valve seat 38; and thereafter lever 62 lifts the poppet 42 out of engagement with its flange 40. Vacuum from the vacuum chamber 24 will thereupon be communicated with the front opposing chamber 14 to decrease the pressure therein, and thereby produce forward motion of the power piston B. When the forward movement of the control lever 62 is stopped, such that the lever 62 is held stationary, a slight additional forward movement of the power piston B will permit the flange 40 of the tubular poppet member 34 to again abut the poppet member 42, thereby preventing further vacuum communication with the forward opposing chamber 14. A lapped condition of control valve C will therefore be established in which further communication of both vacuum and atmospheric pressure with the forward opposing chamber 14 will be prevented; such that the power piston B will remain stationary thereafter. When it is desired to release the brakes, a slight movement to the left as seen in Figure 1 of the control lever 62 will cause the poppet 42 to lift the tubular poppet member 34 out of engagement with the atmospheric valve seat 38, thereby communicating atmospheric pressure with the forward opposing chamber 14. An increase in pressure in the forward opposing chamber 14 will decrease the differential pressure across the power piston B; and thereafter the opposing forces of the driven system connected to the force transmitting levers 52 will cause a rearward movement of the power piston B (to the left as seen in Figure 1) resulting in the reseating of the atmospheric valve seat 38 with the tubular poppet member 34. If the actuating forces on the control lever 62 are only partially removed, a new condition of equilibrium will be established across the control valve C and power piston B to cause the power piston to deliver a proportional amount of force to the force transmitting lever 52. When the actuating forces upon the control lever 62 are completely removed, the poppet 40 will hold the tubular poppet member 34 out of engagement with the atmospheric valve seat 38 to permit full atmospheric pressure to again be supplied the forward opposing chamber 14 causing the power piston B to assume its fully retracted position shown in the drawing. For a more complete understanding of the construction and operation of the general type of servomotor and the force transmitting leverage system with which we are concerned, reference may be had to the previously referred to Hupp et al. Patent No. 2,829,625.

Inasmuch as the face of the flange 40 of the tubular poppet member 34 is coated with a resilient material, it sometimes happens that the poppet member 42 becames stuck or "welded" to the resilient material; such that the diaphragm 64 will not bias the poppet 42 out of engagement with its seat. According to principles of the present invention, means are provided for pulling the poppet member 42 out of engagement with its seat should the two become stuck together. One of the difficulties encountered in providing a suitable mechanism for attaching the control lever 62 with the poppet 42 is that during manual operation of the leverage system, comprising the control lever 62 and force transmitting lever 52, the levers 52 and 62 must be capable of moving away from the power piston B and the tubular push rod 54 without moving the same. This is accomplished in the embodiment shown in the drawing by means of a tubular member 68 the forward end of which is loosely attached to the control lever 62, and into the other end of which a rod attached to the poppet 42 extends. The rod 70 and tubular member 68 are positioned within the tubular push rod 54, and a combination rod guide and vacuum seal 72 is provided adjacent the outer end of the tubular push rod 54 to prevent leakage of air into the forward opposing chamber 14. The lengths of the rod 70 and tubular member 68 are so proportioned that the tubular member and rod will not be moved out of telescopic engagement with each other when the power piston B remains in its fully retracted position and the levers 62 and 52 are completely stroked by manual effort. The upper end of the control lever 62 is provided with a slot 76 which receives a reduced diameter section 74 of the rod 70; such that forward and rearward movement of the control lever 62 will cause abutment of the forked portions of the lever with the shoulders provided on the tubular member 68 by the recess 74. Forward movement of the control lever 62 therefore produces a pulling action on the tubular member 68, and by means of a detent mechanism about to be described, the forward movement of the tubular member 68 will result in a predetermined amount of force being transmitted to the poppet member 42 to overcome the sticking of the poppet member against its valve seat.

The detent mechanism D is a sheet metal stamping having an annular base portion 80 whose spring action urges the base portion into a receiving groove 82 formed in the tubular member 68. The annular base portion 80 is provided with generally radially extending side edges, and the receiving groove 82 is provided with cooperating radially extending shoulders; such that the annular base portion 80 will not be biased out of its receiving groove even though considerable axial forces are transmitted from the tubular member to the detent mechanism. Opposite portions of the annular base portion 80 are deformed outwardly until they project out of their receiving groove 822, and a pair of axially extending fingers 86 extend axially from the bent portions 84 so as to overlie the outer surface of the annular member 68. The ends of the fingers 86 extend past the end of the tubular member 68, and are bent inwardly to be received in a suitable annular recess 88 formed in the rod 70. Spring action of the fingers 86 urges the ends of the fingers 86 into the annular recess 88 with sufficient predetermined force, such that pulling of the tubular member 68 by the control lever 62 will produce a predetermined pulling force upon the poppet member 42 sufficient to overcome the sticking of the poppet against its valve seat. Forward movement of the poppet 42 will be terminated by its abutment with the end of the tubular push rod 54; whereupon additional force delivered to the tubular valve actuating member 68 will cause the fingers 86 to slip out of their receiving recess 88, and thereafter permit the tubular actuating valve member 68 to be moved lengthwise of the valve rod 70. When the ends of the fingers 86 have been moved out of the recess 88, they will of course easily slip over the surface of the reduced diameter section 90 of the valve rod 70 without transmitting appreciable force to the valve rod 70.

Considerable forces may sometimes be required to be transmitted by the control lever 62 in the opposite direction to push the tubular poppet member 34 out of engagement with its seat. This is conveniently accomplished by means of a shoulder 92 provided on the valve rod 70 adjacent the recess 88, and against which the ends of the fingers 86 may abut. Movement of the control lever 62 rearwardly, or towards the left, causes the ends of the fingers 86 to be biased against the shoulder 92 such that appreciable force can be delivered across the detent mechanism D in this direction.

When the system is operating normally and power is available to operate the servomotor A, movement of the control lever 62 to the right does not produce a separation of the tubular valve actuating member 68 in the valve rod 70; and only sufficient relative movement will be provided between the poppet 42 and the power piston B to accomplish a stroking of the control valve C. When power is not available to actuate the servomotor A and the leverage system is operated manually, movement of the control lever 62 to the right will transmit sufficient force to the poppet member 42 through the detent mechanism D to lift the poppet 42 out of engagement with its seat and thereafter bias it against the end of the tubular push rod 54. Thereafter, further movement of the control lever 62 to the right causes the fingers 86 to spring outwardly sufficiently to permit their ends to ride out of the recess 88 in the valve rod 70. Thereafter, continued movement of the control lever 62 will pull the tubular valve actuating member 68 outwardly over the reduced diameter section 90 of the valve rod 70 causing the ends of the fingers 86 to ride along the surface of the section 90 of the valve rod 70. When the actuating movement of the leverage system is stopped and its driven device is permitted to return the levers 62 and 52 toward their retracted positions, rearward movement of the control lever 62 causes poppet 42 to abut its valve seat and thereafter force the tubular valve actuating member 68 rearwardly with respect to the valve rod 70 until the ends of the fingers 86 slip into the recess 88 and abut the shoulder 92. Thereafter, return force on the control member 62 causes the poppet 42 to be pushed into engagement with the flange 40 of the tubular poppet member 34, and the tubular poppet member 34 is caused to be biased out of engagement with the atmospheric valve seat 38 to establish the normal or de-energized condition for the servomotor.

It will be seen that there has been provided a detent mechanism for connecting a rod with a telescoping tubular member utilizing a stamped clip having a base portion whose spring action retains it upon one of the members, and having a pair of integrally formed fingers whose spring action transmits a predetermined force between the members in one direction—the fingers further being adapted to abut a suitable shoulder to transmit considerably greater forces between the members in the opposite direction.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. A detent mechanism for transferring force between axially movable members comprising: a rod member, a tubular member having one end constructed and arranged for telescopic movement with respect to said rod, one of said members having a groove in its outer surface and the other of said members having a recess in its outer surface, said other member being stepped at said recess so that one side edge of said recess is larger than its other side edge, and a spring clip having a generally annularly shaped base portion formed of springy material which biases itself into said groove for retention on the member containing said groove, a pair of generally axially extending fingers projecting from said base portion, the ends of said fingers being bent radially inwardly for reception in said recess and said fingers providing a spring action which biases the ends of said fingers into said recess with generally predetermined force, said fingers transmitting large forces to said other member when the clip is moved against the large side edge of said recess, and only transmitting limited forces to said other member when the clip is moved in the other direction.

2. A detent mechanism for transferring force between axially movable members comprising: a rod member having a recess in its outer surface, a tubular member having one end constructed and arranged for telescopic movement with respect to the portion of said rod on one side of said recess, said tubular member having a groove in its outer surface generally adjacent said end, said rod being stepped at said recess so that its side edge opposite to said tubular member is larger than its side edge adjacent said tubular member, a spring clip having a generally annularly shaped base portion formed of springy material which biases itself into said groove for retention on said tubular member, the end edges of said annular base portion and said groove providing a locking action for transmitting large axial forces thereacross, and a pair of generally axially extending fingers projecting from said base portion over said end of said tubular member, the ends of said fingers being bent radially inwardly for reception in said recess and said fingers being formed of a springy material which biases the ends of said fingers into said recess with generally predetermined force, said fingers transmitting large forces through said clip from said tube to said rod when said tubular member is pushed toward said rod, and only transmitting limited force when said tubular member is moved away from said rod.

References Cited in the file of this patent

UNITED STATES PATENTS

| 314,066 | Sergeant | Mar. 17, 1885 |
| 2,273,861 | Green | Feb. 24, 1942 |
| 2,526,211 | Erickson | Oct. 17, 1950 |